United States Patent [19]

Schenz et al.

[11] Patent Number: 4,615,900

[45] Date of Patent: Oct. 7, 1986

[54] FLAVOR AND MOUTHFEEL CHARACTER OF BEVERAGES

[75] Inventors: Anne F. Schenz, Haworth, N.J.; Jerome Trumbetas, Tarrytown, N.Y.

[73] Assignee: General Foods Corporation, White Plains, N.Y.

[21] Appl. No.: 723,026

[22] Filed: Apr. 15, 1985

[51] Int. Cl.³ .............................................. A23L 2/38
[52] U.S. Cl. ...................................... 426/590; 426/654
[58] Field of Search ............... 426/590, 804, 330.3, 426/534, 656, 533, 591, 650, 654

[56] References Cited

U.S. PATENT DOCUMENTS

| | | | |
|---|---|---|---|
| 2,970,913 | 2/1961 | Loewenstein | 426/654 |
| 3,343,967 | 9/1967 | Rubenstein | 426/654 |
| 3,395,021 | 7/1968 | Glicksman et al. | 426/590 |
| 3,510,310 | 5/1970 | Breckwoldt | 426/590 |
| 3,649,298 | 3/1972 | Kreevoy et al. | 426/591 |
| 3,736,150 | 5/1973 | Basso et al. | 426/590 |
| 4,031,259 | 6/1977 | Lugay et al. | 426/548 |
| 4,411,926 | 10/1983 | Trumbetas et al. | 426/565 |
| 4,479,974 | 10/1984 | Schenz | 426/656 |
| 4,479,975 | 10/1984 | Szczesniak | 426/590 |

*Primary Examiner*—Raymond N. Jones
*Assistant Examiner*—Carolyn Paden
*Attorney, Agent, or Firm*—Thomas A. Marcoux; Thomas R. Savoie; Daniel J. Donovan

[57] ABSTRACT

A method is disclosed for producing an enhanced flavor impact and improved mouthfeel character in a beverage comprising the addition of co-dried, pH adjusted protein or protein hydrolyzate-emulsifier complex to a dry powdered or ready-to-drink beverage resulting in a beverage which has a flavor impact and mouthfeel character which more closely resembles that of the natural fruit juice.

19 Claims, No Drawings

FLAVOR AND MOUTHFEEL CHARACTER OF BEVERAGES

TECHNICAL FIELD

The invention relates to beverages and more particularly to the addition of certain chemical compounds or compositions which have been found to have utility in the alteration of flavor or mouthfeel characteristics of said beverages.

BACKGROUND ART

In the food industry there is a constant demand for the production of additives, whether naturally occurring or synthetic, which are capable of imparting desirable characteristics to foodstuffs. It is common in some segments of the industry to add flavor agents to enhance or bring out a desirable characteristic in products and by so doing, render the product more desirable from a consumer preference standpoint.

U.S. Pat. No. 3,395,021 issued to Glicksman, et al., teaches a dry fruit flavor beverage mix containing edible acids such as citric, tartaric, adipic, and fumaric acids. These acids in combination with a gum system produce a product which is similar in flavor and mouthfeel to a fresh fruit beverage. The acids provide tartness in the reconstituted beverage.

U.S. Pat. No. 3,736,150 entitled "Beverage Containing Egg Albumen and Amino Acid" issued to Basso, et al., teaches the addition of egg albumen and an amino acid (glycine) to a dry beverage mix, where the egg albumen and glycine are present as the major sources of protein. The glycine also serves an additional function as a flavor enhancer, masking the objectionable egg odor and taste, resulting in a product that is substantially indistinguishable from a similar beverage with all the protein omitted.

U.S. Pat. No. 3,649,298 entitled "Carbonation Concentrates For Beverages and Process of Producing Carbonated Beverages" issued to Kreevoy teaches a dry beverage mix containing n-carboxy-amino acid anhydride in combination with the disodium salts of n-carboxy-amino acid producing a carbonated beverage.

U.S. Pat. No. 3,510,310 entitled "Artificially Sweetened Beverages and Mixtures Thereof" issued to Breckwoldt teaches a dry beverage mix comprising an edible water-soluble amino carboxylic acid (e.g., glycine, lysine, methionine, etc.). This mix is reconstituted to provide a beverage having a taste and texture similar to the beverage sweetened with sugar. This invention purports to solve the adverse problem associated with artificially sweetened beverages in overcoming the lack of texture and mouthfeel that is inherent in such a beverage.

U.S. Pat. No. 4,031,259 entitled "Process of Preparing Nutritive Sweetening Compositions" issued to Lugay, et al., teaches a process for improving the solubility and stability of dipeptide nutritive sweeteners comprising co-drying an amino acid derived nutritive sweetener with a low molecular weight polypeptide, preferably an enzymatically hydrolyzed non-gelatin protein, wherein the ratio of sweetener to polypeptide is from about 1:1 to about 1:20.

U.S. Pat. No. 4,479,974 entitled "Amino Acids as Dry Beverage Mix Ingredients" issued to Schenz, teaches a method of producing an enhanced flavor impact and an improved mouth feel character in a dry beverage mix comprising the addition of amino acids. The specific amino acids which would produce the effect were L-proline, L-asparagine, L-aspartic acid, L-arginine, γ-amino-n-butyric acid, L-alanine, L-glutamine and combinations thereof. The level of incorporation of the amino acids in a dry mix varies from 0.1% to 8% on a dry weight basis.

U.S. Pat. No. 4,479,975 entitled "Improved Fruit Flavored Beverages" issued also to Schenz, et al., teaches alteration of the flavor and mouthfeel character in dry beverage mixes through the addition of a protein hydrolyzate which must be soluble at acid pH's, be bland, and possess no appreciable off flavors or odors. The disclosure contemplates the addition of proteins which have been either chemically or enzymatically hydrolyzed and derived from either animal or vegetable matter.

It is thus obvious that the prior art appreciates the importance of amino acids as flavor contributors to fruit juices which in themselves contain from 1-9% proteinaceous material on a dry weight basis. It does not, however, teach or appreciate the utilization of protein in combination with an emulsifier to create a resultant impact on flavor and mouth feel character which is more juice-like than in prior disclosures.

There has been a constant demand in the food art for the production of a formulated beverage, whether it be a dry beverage mix, ready-to-drink beverage or beverage concentrate which would contain a flavor and mouthfeel more akin to a real fruit juice. We today disclose a novel method to meet this objective which does not require utilization of amino acids.

SUMMARY OF THE INVENTION

The objectives of the present invention are achieved through the addition of a co-dried, protein or protein hydrolyzate-emulsifier complex to an acidic, powdered or ready-to-drink beverage resulting in a beverage having a flavor impact and mouthfeel character which more closely resembles that of the natural fruit juice.

DISCLOSURE OF THE INVENTION

This invention relates to a method of producing an enhanced flavor impact and an improved mouthfeel character in an acidic, dry, powdered or ready-to-drink beverage mix comprising the addition of a protein or protein hydrolyzate-emulsifier complex. By protein or protein hydrolyzate-emulsifier complex is meant that complex which is obtained by first dispersing a protein source selected from the group consisting of vegetable proteins and hydrolyzates such as soy isolates, soy concentrates soy hydrolyzates, gelatin hydrolyzate, sodium caseinate or combinations thereof into water at a ratio of one part protein hydrolyzate to between 1 and 100 parts of water, preferably between 10 and 100 parts of water. The pH of this protein hydrolyzate dispersion is then adjusted with a food grade alkali to expose the protein's hydrophobic sites. The pH range is typically between 6.0 and 9.0 with an adjustment to 6.5 to 8.5 being preferred with a range of from 7.0 to 7.5 being more preferred.

A quantity of one or more of the following emulsifiers: sodium succinoylated glycerol mono stearate, sodium stearoyl lactylate, lecithin, polysorbate 60 or any non-ionic emulsifier is then added to the protein or protein hydrolyzate solution in an amount sufficient to bind most of the proteins hydrophobic binding sites. This quantity is typically between 0.02 and 2 parts of emulsifier and preferably between 0.1 and 1 part emulsifier, per part of protein material. A sucrose carrier may then be added to the mixture. This sucrose carrier typically will be added in levels between 1 to about 5 parts sucrose per part protein or protein hydrolyzate. The protein or protein hydrolyzate-emulsifier-water-sucrose combination is mixed for between 15 seconds and 1 hour, as necessary to allow the emulsifier to equilibrate with the protein's hydrophobic binding sites. The mixing time may fall within the lower range if the dispersion is heated.

This protein or protein-hydrolyzate emulsifier complex, once formed, is stabilized by drying. Any standard drying technique that does not subject the complex to undue heating, e.g., spray or freeze-drying may be used to co-dry the complex. This method of preparing the protein or protein hydrolyzate-emulsifier complex is disclosed in U.S. Pat. No. 4,411,926 to Trumbetas, et al. and is herein incorporated by reference.

The level of incorporation of this protein or protein hydrolyzate-emulsifier complex varies from 0.05 to 0.5% on a dry weight basis, preferably from 0.2 to 0.4%. When the dry beverage mix is reconstituted the protein or protein hydrolyzate-emulsifier complex will be present at a level of from 0.1 to 1.0 grams per liter on an as-consumed basis, preferably from 0.2 to 0.6 grams per liter of beverage.

The resulting reconstituted beverage has a significantly improved flavor and mouthfeel character and matches closely the sensory properties of natural fruit juice. The presence of the protein or protein hydrolyzate-emulsifier complex functions organoleptically to produce an overall blending of aromatic flavors and basic tastes which yields a closer resemblance to real fruit juice.

The effect of the protein or protein hydrolyzate-emulsifier complex is similar, but represents an improvement over prior teachings in that a mouthfeel more closely to that of natural fruit juice is obtained to that taught in the previously mentioned U.S. patents. Viewed against these teachings, it is surprising that a complex consisting of a protein or protein hydrolyzate co-dried with an emulsifier would produce such an improved effect.

It is believed that the protein or protein hydrolyzate-emulsifier complex benefit is probably a surface-active effect, since the surface tension of the beverage is lowered. This surface-related mechanism is also suggested by the surfactant nature of protein or protein hydrolyzate and emulsifier and by the noticable effect produced by such a small amount of material. This invention significantly decreases sensory differences between powdered or ready-to-drink beverages and fresh fruit juices. Additionally, the incorporation of emulsifier and protein or protein hydrolyzate is significantly more cost effective and meets regulatory standards better than amino acids.

The beverages of the present invention will preferably be fruit-flavored beverages which in addition to containing the protein or protein hydrolyzate-emulsifier complex will contain sweeteners, flavoring agents, clouding agents, colors, antioxidants, buffering agents, nutritional additives (e.g., vitamins) and other ingredients which have been known to be present in these beverages.

EXAMPLE I

Two orange-flavored, dry beverage mixes were prepared containing the following ingredients as reported in Table 1. Sample 1 was a control, and Sample 2 contained the protein hydrolyzate-emulsifier complex in addition to the control formula.

TABLE 1

| | Dry Beverage Mix (makes 1 liter of beverage) | |
|---|---|---|
| Ingredient | Sample 1 (Control) | Sample 2 (with Protein Hydrolyzate Emulsifier) (Complex) |
| Sugars | 124.0 | 124.0 |
| Food Grade Acids | 8.0 | 8.0 |
| Buffer Salts | 3.0 | 3.0 |
| Vitamins | 0.7 | 0.7 |
| Artificial Colors | 0.4 | 0.4 |
| Clouding Agent | 3.0 | 3.0 |
| Thickening Agents | 1.4 | 1.4 |
| Protein-Emulsifier Complex - Consisting of Soy Protein Hydrolyzate (Gunther Acid Soluble Protein 1535) Soy Lecithin Emulsifier and a Sucrose Carrier | — | 0.4 |
| Orange Flavors | 1.7 | 1.7 |
| Total (grams) | 142.2 | 142.6 |

Sample 2 contained 0.3% protein hydrolyzate-emulsifier complex on a dry weight basis. Both samples were reconstituted with water to make one liter of beverage. The beverages were stirred until all material had dissolved completely. Sample 2 contained 0.4 grams per liter of protein hydrolyzate-emulsifier complex on an as-consumed basis. The samples were evaluated by a bench top trained taste panel and their sensory characteristics are reported below in table.

TABLE 2

| SENSORY CHARACTERISTICS | |
|---|---|
| Sample 1 (control) | sweet, then tart, moderate to high orange, orange peel/juice flavor. |
| Sample 2 (with complex) | more body and thickness than sample 1, slightly slipperier mouthfeel than 1, slightly less sweet. |

What is claimed is:

1. A method of producing an enhanced flavor impact and an improved mouthfeel character in an acidic dry powdered beverage mix comprising the addition to said beverage of a co-dried, pH adjusted, protein or protein hydrolyzate-emulsifier complex at a level of from about 0.05% to about 0.5% on a dry weight basis.

2. The method of claim 1 wherein the complex is incorporated at a level of from about 0.2% to 0.4% on a dry weight basis.

3. The method of claim 1 wherein the protein or protein hydrolysate of said protein or protein hydrolyzate-emulsifier complex is selected from the group consisting of vegetable proteins and hydrolyzates including soy isolates, soy concentrate, sodium casseinate, soy hydrolyzates, gelatin hydrolyzates or combinations thereof.

4. The method of claim 3 wherein the protein hydrolysate is soy hydrolyzates.

5. The method of claim 1 wherein the emulsifier is selected from the group consisting of sodium succinoylated glycerol mono stearate, lecithin or a combination thereof.

6. The method of claim 5 wherein the emulsifier is lecithin.

7. The method of claim 1 wherein the ratio of emulsifier to protein or protein hydrolyzate is from about 0.02 to about 2 part emulsifier to one part protein or protein hydrolysate.

8. The method of claim 7 wherein the ratio of emulsifier to protein or protein hydrolyzate is from about 0.01 to about 1 part emulsifier to one part protein or protein hydrolysate.

9. The method of claim 1 wherein the pH of said emulsifier-protein or protein hydrolyzate is from about 6.0 to about 9.0.

10. The method of claim 9 wherein the pH is from about 7.0 to about 7.5.

11. A method of producing an enhanced flavor impact and an improved mouthfeel character in an acidic ready-to-drink beverage comprising the addition to said beverage of a co-dried, pH adjusted, protein or protein hydrolyzate-emulsifier complex at a level of from about 0.1 to about 1.0 grams per liter on an as consumed basis.

12. The method of claim 11 wherein the complex is incorporated at a level of from about 0.2 to about 0.6 grams per liter.

13. The method of claim 11 wherein the protein or protein hydrolysate of said protein or protein hydrolyzate-emulsifier complex is selected from the group consisting of vegetable proteins and hydrolyzates including soy isolates, soy concentrate, sodium casseinate, soy hydrolyzates, gelatin hydrolyzates or combinations thereof.

14. The method of claim 13 wherein the protein hydrolysate is soy hydrolyzates.

15. The method of claim 11 wherein the emulsifier is selected from the group consisting of sodium succinoylated glycerol mono stearate, lecithin or a combination thereof.

16. The method of claim 15 wherein the emulsifier is lecithin.

17. The method of claim 11 wherein the ratio of emulsifier to protein or protein hydrolyzate is from about 0.02 to about 2 part emulsifier to one part protein or protein hydrolysate.

18. The method of claim 11 wherein the pH of said emulsifier-protein or protein hydrolyzate is from about 6.0 to about 9.0.

19. The method of claim 18 wherein the pH is from about 7.0 to about 7.5.

* * * * *